United States Patent
Xiao et al.

(10) Patent No.: US 11,493,102 B2
(45) Date of Patent: Nov. 8, 2022

(54) FULL CARBON-CERAMIC AXLE-MOUNTED BRAKE DISC

(71) Applicant: HUNAN SHIXIN NEW MATERIALS CO., LTD, Zhuzhou (CN)

(72) Inventors: Peng Xiao, Zhuzhou (CN); Suhua Zhu, Zhuzhou (CN)

(73) Assignee: HUNAN SHIXIN NEW MATERIALS CO., LTD, Zhuzhou (CN)

( * ) Notice: Subject to any disclaimer, the term of this patent is extended or adjusted under 35 U.S.C. 154(b) by 116 days.

(21) Appl. No.: 16/982,058

(22) PCT Filed: Dec. 26, 2018

(86) PCT No.: PCT/CN2018/123899
§ 371 (c)(1),
(2) Date: Sep. 18, 2020

(87) PCT Pub. No.: WO2020/103282
PCT Pub. Date: May 28, 2020

(65) Prior Publication Data
US 2021/0095732 A1    Apr. 1, 2021

(30) Foreign Application Priority Data

Nov. 23, 2018 (CN) .......................... 201811407595.7

(51) Int. Cl.
    *F16D 65/12*     (2006.01)
    *F16D 69/02*     (2006.01)
    *F16D 65/02*     (2006.01)

(52) U.S. Cl.
    CPC ......... *F16D 65/128* (2013.01); *F16D 65/126* (2013.01); *F16D 69/02* (2013.01);
(Continued)

(58) Field of Classification Search
    CPC ....................... F16D 65/12; F16D 65/123–128
(Continued)

(56) References Cited

U.S. PATENT DOCUMENTS 6,119,820 A * 9/2000 Steptoe ................. F16D 65/128
                                                      188/71.6
6,164,423 A * 12/2000 Dickerson ............... F16D 65/12
                                                    188/218 XL
(Continued)

FOREIGN PATENT DOCUMENTS

| CN | 1786507 A | 6/2006 |
|---|---|---|
| CN | 201420820 Y | 3/2010 |

(Continued)

*Primary Examiner* — Christopher P Schwartz
(74) *Attorney, Agent, or Firm* — Bayramoglu Law Offices LLC (57) ABSTRACT

A full carbon-ceramic axle-mounted brake disc is disclosed, including a disc hub and a plurality of friction discs sleeved on the disc hub and coaxially stacked. The plurality of friction discs and the friction discs and the disc hub are locked and connected integrally through connecting structures. The friction discs are made of a carbon-ceramic composite material and are composed of heat dissipation reinforcing ribs arranged radially on a disc face and a back face, the heat dissipation reinforcing ribs between the stacked friction discs being in contact with each other on a one-to-one basis. Radial heat dissipation channels are formed on two sides of the heat dissipation reinforcing rib, and a connecting groove connecting the radial heat dissipation channels on the two sides is formed between the heat dissipation reinforcing ribs.

13 Claims, 6 Drawing Sheets

(52) U.S. Cl.
CPC .......... *F16D 2065/132* (2013.01); *F16D 2065/1328* (2013.01); *F16D 2065/1344* (2013.01); *F16D 2065/1388* (2013.01); *F16D 2065/1392* (2013.01); *F16D 2200/0052* (2013.01)

(58) Field of Classification Search
USPC .......... 188/18 A, 218 A, 218 XL, 264 A, 188/264 AA
See application file for complete search history.

(56) References Cited

U.S. PATENT DOCUMENTS

| | | | | |
|---|---|---|---|---|
| 9,791,007 | B2 * | 10/2017 | Wurth | ............ F16D 65/122 |
| 2013/0284548 | A1 * | 10/2013 | Guether | ............ C04B 35/634 |
| | | | | 188/218 XL |

FOREIGN PATENT DOCUMENTS

| | | |
|---|---|---|
| CN | 101865223 A | 10/2010 |
| CN | 104302939 A | 1/2015 |
| CN | 204755671 U | 11/2015 |
| CN | 105485215 A | 4/2016 |
| CN | 105587805 A | 5/2016 |
| CN | 107654540 A | 2/2018 |
| CN | 108317194 A | 7/2018 |
| CN | 108425972 A | 8/2018 |
| CN | 207864486 U | 9/2018 |
| KR | 20070023155 A | 2/2007 |

* cited by examiner

FULL CARBON-CERAMIC AXLE-MOUNTED BRAKE DISC

CROSS REFERENCE TO THE RELATED APPLICATIONS

This application is the national stage entry of International Application No. PCT/CN2018/123899, filed on Dec. 26, 2018, which is based upon and claims priority to Chinese Patent Application No. 201811407595.7, filed on Nov. 23, 2018, the entire contents of which are incorporated herein by reference

TECHNICAL FIELD

The present invention belongs to the braking technology of transport vehicles (including a train, an automobile, a heavy-duty truck, and the like), and in particular, relates to a full carbon-ceramic axle-mounted brake disc.

BACKGROUND

Brake disc, as a key component in transport vehicles, is crucial to the safe operation of transport vehicles. Due to the complex and harsh working environment of the brake disc and inconvenient maintenance and replacement, brake disc products are required to provide reliable braking, facilitate convenient maintenance, and have a long service life. At present, brake discs used in transport vehicles are generally made of a metal material such as cast steel (iron) or forged steel, which are characterized by high technological maturity, low costs, and applicability to a wide range of speeds, and have been widely used at home and abroad. However, traditional brake discs made of cast steel (iron) or forged steel are heavy, which is not only inconvenient for installation and maintenance, but also increases the energy consumption of the transport vehicle. In addition, during braking, a huge braking heat load causes the brake disc to produce great thermal stress, and a cyclic action of uneven temperature field and stress field is likely to cause microcracks in the brake disc. When the microcracks expand to a certain extent, the brake disc undergoes fatigue fracture Especially in the field of high-speed trains, as a speed of the train continues to increase, when the speed reaches or even exceeds 350 Km/h, a temperature rises sharply due to braking. The existing material of the brake disc is prone to cracks on a friction face, which basically reaches the limit of the material.

A brake disc made of a carbon-ceramic composite material is used to replace the existing metal brake disc, which can reduce the unsprung weight of the transport vehicle and reduce the power loss. Moreover, the carbon-ceramic composite brake disc has a series of advantages such as excellent friction performance, high temperature resistance, and applicability to a wide range of environments, which is the future development direction of brake disc materials. However, heat dissipation of carbon-ceramic composite materials is worse than that of metal materials, and more heat is generated by friction at high speed. Therefore, it is necessary to design a structure with more excellent heat dissipation in the structure to greatly improve the heat dissipation effect of the disc. In addition, carbon-ceramic composite materials are brittle and has poor workability, making it difficult to fabricate heat dissipation reinforcing ribs inside the brake disc, especially for axle-mounted brake discs. In addition, for the carbon-ceramic brake disc, how to realize integration with an interface of the transport vehicle while ensuring structural strength also needs to be considered.

At present, most structural designs of the brake discs are for metal brake discs, and the heat dissipation structure is usually made by integral casting, and is not suitable for carbon-ceramic brake discs. Reports on the carbon-ceramic brake discs are generally limited to the process of disc manufacturing, and do not involve a specific structural design. Therefore, how to design and prepare a full carbon-ceramic brake disc that has an excellent heat dissipation effect and can realize integration with the interface of the transport vehicle and ensure structural strength of the brake disc is still an urgent problem to be resolved.

SUMMARY

Technical Problem

The technical problem to be resolved by the present invention is to provide a novel full carbon-ceramic axle-mounted brake disc in view of the difficulty in applying a carbon-ceramic composite material to a brake of a transport vehicle due to material characteristics.

Solutions to the Problem

Technical Solutions

The present invention is implemented by the following technical solutions.

In the present invention, a full carbon-ceramic axle-mounted brake disc is provided, including a disc hub (2) and a plurality of friction discs (1) sleeved on the disc hub (2) and coaxially stacked, where the plurality of friction discs and the friction discs (1) and the disc hub (2) are locked and integrally connected through connecting structures, and the friction discs (1) are made of a carbon-ceramic composite material and are composed of heat dissipation reinforcing ribs (11) arranged radially on a disc face (10) and a back face, the heat dissipation reinforcing ribs (11) between the stacked friction discs being in contact with each other on a one-to-one basis.

In the friction disc (1), radial heat dissipation channels (12) are formed on two sides of the heat dissipation reinforcing rib (11), and a connecting groove (13) connecting the radial heat dissipation channels on the two sides is formed between the heat dissipation reinforcing ribs (11).

A thickness of the disc face of the friction disc is $2/5$-$2/3$ of a thickness of the friction disc (1). A thickness of the heat dissipation reinforcing rib (11) is $1/3$-$3/5$ of the thickness of the friction disc (1). The thickness of the disc face of the friction disc+the thickness of the heat dissipation reinforcing rib (11)=the thickness of the friction disc (1).

The heat dissipation reinforcing ribs (11) are symmetrically distributed with respect to a center of the disc face; and the heat dissipation reinforcing ribs (11) include two types of reinforcing ribs, heat dissipation reinforcing ribs distributed along an outer circumference of a friction disc body in the heat dissipation reinforcing ribs (11) being defined as first-type reinforcing ribs (11a), and heat dissipation reinforcing ribs distributed along an inner circumference of the friction disc body in the heat dissipation reinforcing ribs (11) being defined as second-type reinforcing ribs (11b), where the first-type reinforcing ribs (11a) and the second-type reinforcing ribs (11b) are arranged in a staggered manner at a specified angle in a circumferential direction, the angle ranging from 10° to 45°.

There is a gap between adjacent first-type reinforcing ribs (11a), the gap forming an air inlet (12a) of the radial heat dissipation channel (12).

The second-type reinforcing rib (11b) is provided with a recessed structure, the bottom of the recessed structure being processed with a notch, and the notch forming an air outlet (12b) of the radial heat dissipation channel (12); and a connecting groove (13) is formed between adjacent second-type reinforcing ribs (11b), the connecting groove (13) being communicated with the radial heat dissipation channel (12), and the radial heat dissipation channel (12) being communicated with the outside.

Along a direction perpendicular to the disc face of the friction disc (1), a total projected area of the first-type reinforcing ribs (11a) accounts for 30-45% of a projected area of the friction disc (1), and a total projected area of the second-type reinforcing ribs (11b) accounts for 10-25% of the projected area of the friction disc (1). The number of first-type reinforcing ribs (11a) and second-type reinforcing ribs (11b) is 3-30.

Along a direction perpendicular to the disc face of the friction disc (1), a projection of a single reinforcing rib of the first-type reinforcing ribs (11a) is an arc, a center of the arc being an intersection of a center line of the arc and an outer circumference of the friction disc (1); and a length of the first-type reinforcing rib (11a) along a radial direction is $1/10$-$1/6$ of a radius of the friction disc (1).

Along the direction perpendicular to the disc face of the friction disc (1), a projection of a single reinforcing rib of the second-type reinforcing ribs (11b) is a "U" shape, an open end of the "U" shape faces a projection center of the friction disc (1), and a closed end of the "U" shape faces outward; two sides of the reinforcing rib (11b) are symmetrical along a radial direction, and an included angle between the side and a diameter is 10-20°; an arc at the closed end of the "U" shape is tangent to the two sides; and a length of the second-type reinforcing rib (11b) along a radial direction is $1/8$-$3/8$ of the radius of the friction disc (1). In a preferred solution, along the direction perpendicular to the disc face of the friction disc (1), a projection of a single reinforcing rib of the second-type reinforcing ribs is a "U" shape; a width of the U shape is $1/16$-$1/2$ of a radius of the friction disc (1); and a length from an closed end to an opening of the U shape is $1/4$-$3/8$ of the radius of the friction disc (1).

Rivet holes (15) and dynamic balance holes (16) are alternately disposed on the first-type reinforcing ribs (11a); the rivet hole (15) is a through hole penetrating the disc face; and the dynamic balance hole (16) is a blind hole, a depth thereof being less than or equal to a thickness of the first-type reinforcing rib (11a).

Preferably, in the full carbon-ceramic axle-mounted brake disc of the present invention, the air inlet (12a), the connecting groove (13), and the air outlet (12b) form a curved diameter-changing channel (17).

Preferably, in the full carbon-ceramic axle-mounted brake disc of the present invention, the connecting grooves (13) are symmetrically distributed with respect to the center of the disc face of the friction disc (1); and all connecting grooves (13) are communicated to form a wave-shaped heat dissipation channel (14).

Preferably, in the full carbon-ceramic axle-mounted brake disc of the present invention, the connecting structure includes a rivet (7) for stacking and circumferential positioning between the friction discs (1) and a bolt assembly for locking between the friction disc (1) and the disc hub (2).

The rivet (7) is fixedly inserted into a rivet hole (15) between the stacked friction discs, a ferrule (71) being sleeved on the rivet (7).

The bolt assembly includes an axial positioning washer (3), a torque pin (4), a bolt (5), a nut (6), and a steel sleeve (8), the steel sleeve (8) being inserted into a bolt hole of the friction disc (1), the bolt (5) being inserted through the bolt hole on the friction disc (1) and the disc hub (2) and being fastened by the nut (6), the axial positioning washers (3) being respectively cushioned on outer sides of the friction disc and the disc hub and between the nut (6) and a screw cap of the bolt (5), and the torque pin (4) being assembled between the axial positioning washer (3) and the disc hub (2).

Preferably, in the full carbon-ceramic axle-mounted brake disc of the present invention, the rivet is made of a metal material, and a length of the rivet is $1/16$-$1/2$ of a total thickness of the brake disc and is preferably $1/8$-$1/4$ of the total thickness of the brake disc. A thermal expansion coefficient of the metal material is less than or equal to $10 \times 10^{-6}$/K, and shear tensile strength thereof is greater than or equal to 400 MPa. In industrial applications, the metal with a low thermal expansion coefficient is selected from at least one of 00Cr27Mo, 00Cr30Mo, 4J36, and the like.

Preferably, in the full carbon-ceramic axle-mounted brake disc of the present invention, the friction discs (1) are made of a carbon-ceramic composite material with a density of 1.8-2.6 g/cm$^3$.

Preferably, in the full carbon-ceramic axle-mounted brake disc of the present invention, the friction disc (1) can be formed by splicing several friction discs (1') split along a radial direction, independent connecting structures being disposed between the stacked split friction discs (1') and between the split friction discs (1') and the disc hub.

Beneficial Effects of the Present Invention

Beneficial Effects

The present invention has the following beneficial effects:

(1) In view of the workability of the carbon-ceramic composite material, the brake disc is designed to have a split structure (at least two split friction discs), and the split friction discs are respectively produced, processed, and then stacked. First, it is conducive to the design of the heat dissipation structure of the entire disc, and the disc can be milled on a non-friction face into a required shape, thereby avoiding process difficulties caused by overall processing of the heat dissipation channel and the reinforcing rib. Second, it is conducive to material uniformity of two friction faces of the brake disc, thereby avoiding uneven wear during braking due to uneven compositions in the overall ceramization process of the brake disc. Third, it is conducive to improvement of the overall anti-oxidation characteristic of the brake disc. The heat dissipation structure can form a tightly bonded SIC coating in the ceramization process without the need for subsequent additional anti-oxidation treatment. In addition, a single brake disc can also be assembled by splicing split brake discs. If a region of the brake disc is damaged, only the split brake disc in the region can be replaced and maintained, thereby further improving convenience of disassembly, assembly and maintenance of the brake disc and reducing use costs.

(2) The two types of heat dissipation reinforcing ribs are alternately disposed and/or intersect with each other. The relative positions, three-dimensional shapes, and projected areas of the two are adjusted, so that stress concentration can be dispersed while achieving high-efficiency heat dissipation, thereby avoiding a problem that the heat dissipation ribs are easily broken due to low strength of the carbon-ceramic material and ensuring structural strength of the carbon-ceramic brake disc. After verification, in the obtained product, a maximum shear stress of a carbon-ceramic heat dissipation is less than 1 MPa and is much lower than failure strength of the carbon-ceramic material. This resolves a long-standing problem that heat dissipation and strength of the carbon-ceramic brake disc cannot be coordinated. In the present invention, the two types of reinforcing ribs are arranged in a staggered manner to form a wave-shaped three-dimensional heat dissipation channel, thereby facilitating air flow and enhancing the convection heat dissipation effect. In addition, two side faces of the heat dissipation reinforcing rib are processed into symmetrical curved surfaces. Therefore, the radial heat dissipation channel forms a curved diameter-changing channel, and by means of the change of the flow velocity of the airflow in the variable cross-section channel, the flow of air is accelerated and more heat can be taken away, thereby improving the heat dissipation efficiency. The wave-shaped three-dimensional heat dissipation channel connects all radial heat dissipation channels to form a three-dimensional heat dissipation system penetrating the entire brake disc.

(3) The steel sleeve disposed in the bolt hole of the carbon-ceramic brake disc can realize a friction connection between two split friction discs, and increase a shear force of the steel sleeve. In this way, stability of connection strength of the entire structure is increased, the bolt is prevented from being eccentric under a moment load and causing the brake disc to be subjected to large uneven static pressure, a force of the disc body connecting the bolt to the rivet is reduced, and the bolt and the rivet are prevented from breaking (4) The rivet is made of a metal material with a low thermal expansion coefficient. In addition, in the present invention, it is unexpectedly found that a length of the rivet is reasonably designed according to a thermal expansion coefficient difference between the carbon-ceramic friction disc and the rivet while ensuring connection strength, so that a probability of a brake disc axial relaxation phenomenon due to excessive elongation of the rivet caused by a temperature rise during braking is greatly reduced, and a service life of the product is greatly prolonged. This is beyond expectations.

(5) Because a density of the carbon-ceramic brake disc is only about ⅓ of a density of a metal brake disc and hardness thereof is rather high, if a traditional method of machining and de-weighting is used to achieve dynamic balance, an excessively removed volume of the carbon-ceramic brake disc affects structural integrity and increases machining strength. In the present invention, the dynamic balance holes are evenly distributed along a circumferential direction on the brake disc, and metal blocks with higher density can be embedded in the dynamic balance holes, thereby ingeniously resolving a problem that the carbon-ceramic brake disc needs to be processed and de-weighted due to imbalance.

In view of the above, the axle-mounted brake disc of the present invention has the advantages of a simple structure, excellent heat dissipation effects, reliable connection, high structural strength, convenient maintenance, and a light weight, and reduces the energy consumption and maintenance costs of a transport vehicle (especially a high-speed and high-load transport vehicle) while ensuring reliable braking.

The present invention is further described below with reference to the accompanying drawings and specific implementations.

Reference numerals: 1. Friction disc; 1'. Split friction disc; 11. Heat dissipation reinforcing rib; 11a. First-type heat dissipation reinforcing rib; 11a. Second-type heat dissipation reinforcing rib; 12. Radial heat dissipation channel; 12a. Air inlet; 12b. Air outlet; 13. Connecting groove; 14. Planar heat dissipation channel; 15. Rivet hole; 16. Dynamic balance hole; 17. Curved diameter-changing channel.
2. Disc hub; 3. Axial positioning washer; 4. Torque pin; 5. Bolt; 6. Nut, 7. Rivet, 71. Ferrule; 72. Washer; 8. Steel sleeve.

DETAILED DESCRIPTION OF THE EMBODIMENTS

Figure 1:
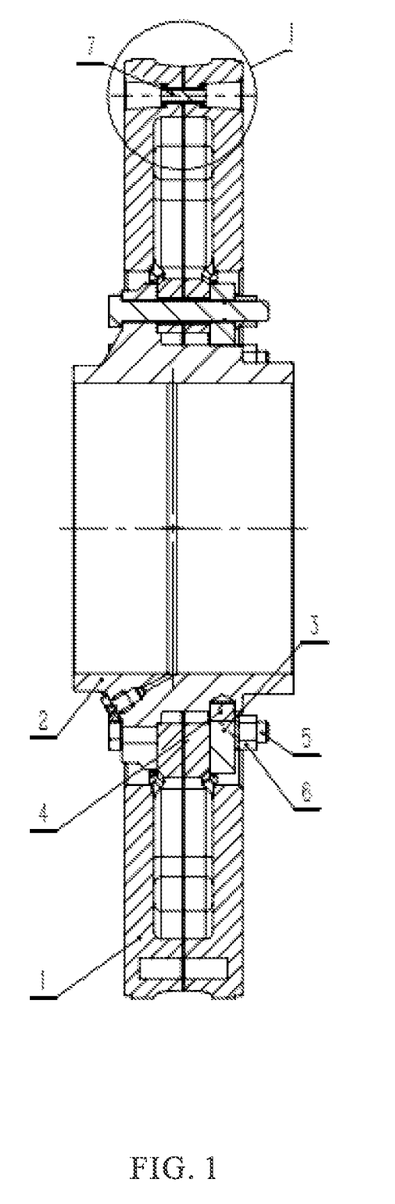
FIG. 1 is an assembly cross-sectional view of a full carbon-ceramic axle-mounted brake disc in an embodiment.
Figure 2:
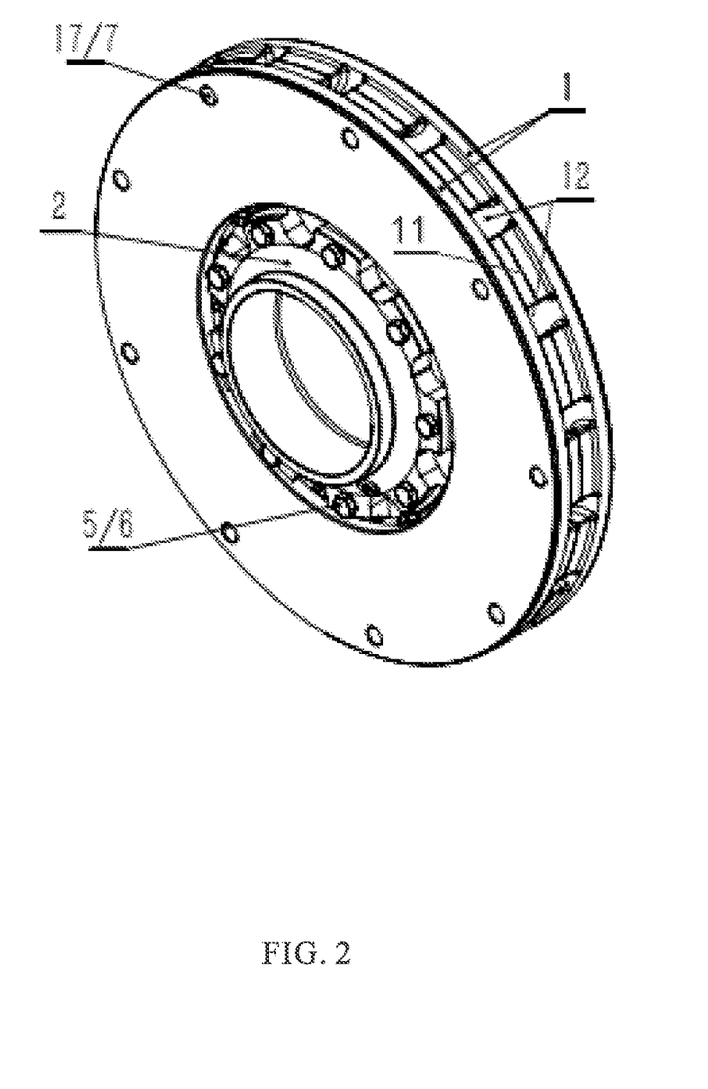
FIG. 2 is a three-dimensional schematic diagram of a full carbon-ceramic axle-mounted brake disc in an embodiment.

Referring to FIG. 1 and FIG. 2, the full carbon-ceramic axle-mounted brake disc in the figure is a preferred solution of the present invention, and specifically includes a friction disc 1, a disc hub 2, an axial positioning washer 3, a torque pin 4, a bolt 5, a nut 6, and a rivet 7. The friction disc 1 is a ring made of a carbon-ceramic composite material. Two annular friction discs 1 are coaxially stacked and fixedly sleeved on the disc hub 2, and are fixedly connected to an axle through the disc hub 2. The friction discs 1 are connected through the rivet 7 and are positioned circumferentially, and a flange part of an inner ring of the friction disc 1 and the disc hub 2 are locked and connected by several sets of bolt assemblies composed of the axial positioning washer 3, the torque pin 4, the bolt 5, and the nut 6. This embodiment aims to specifically describe a heat dissipation structure of the brake disc and a connection between the brake disc and the disc hub, and therefore a friction brake pad and a hydraulic system for squeezing and friction of the brake disc are omitted. The friction brake pad can be made of the same carbon-ceramic composite material as the brake disc, and the hydraulic system is the same as the existing axle-mounted brake Details are not described in this embodiment.

Figure 3:
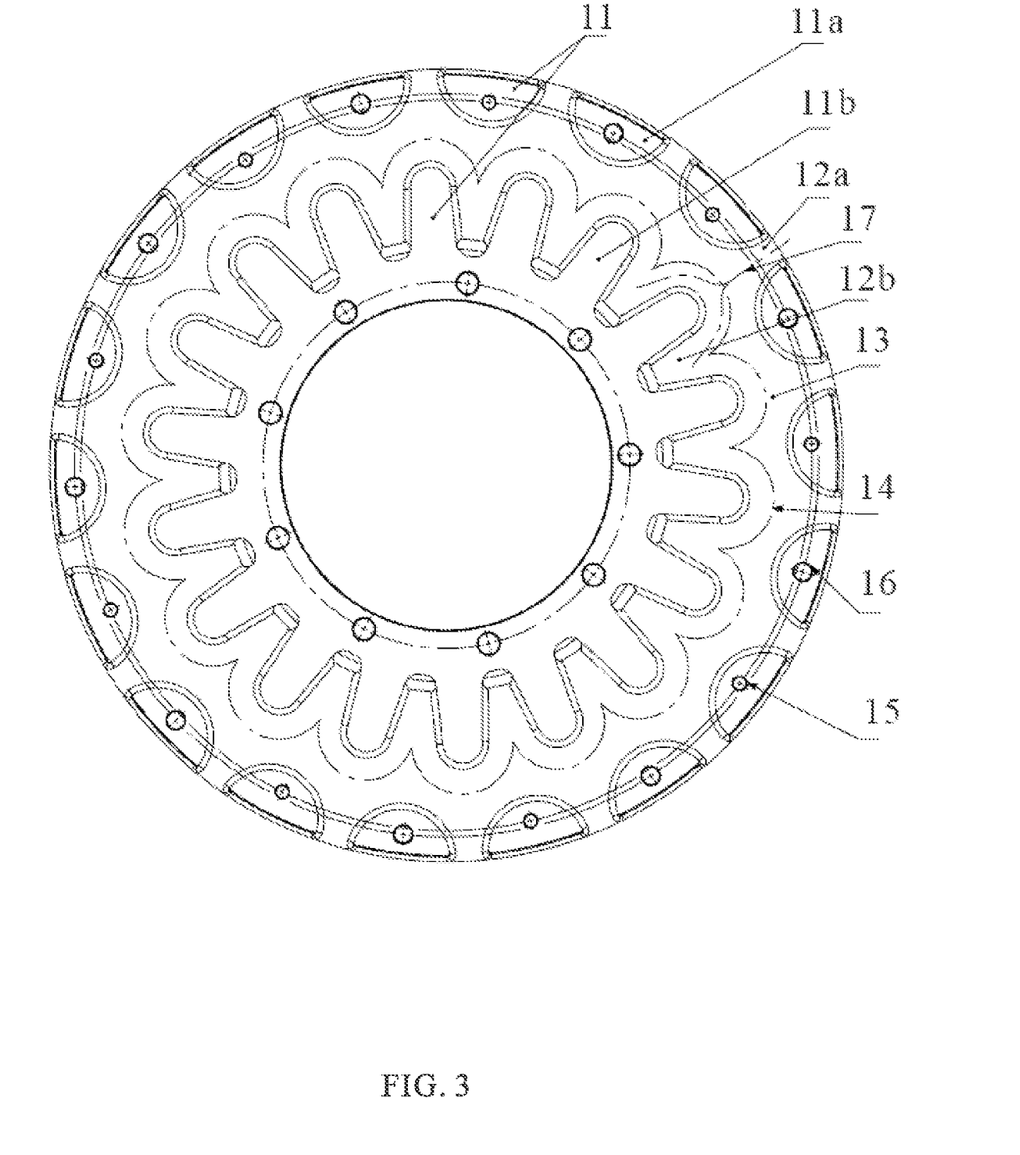
FIG. 3 is a front view of a friction disc in an embodiment.

As shown in FIG. 3, an outer disc face of the friction disc is used for contact with the friction brake pad and is processed into a flat surface. An inner disc face is used for stacking contact between the friction discs 1, and a heat dissipation reinforcing rib 11 is fabricated on the inner disc face to form a heat dissipation channel A thickness of the disc face of the friction disc is ⅖-⅔ of a thickness of the friction disc 1, and a thickness of the heat dissipation reinforcing rib 11 is ⅓-⅗ of the thickness of the friction disc 1.

The heat dissipation reinforcing ribs 11 are symmetrically distributed with respect to a center of the disc face, and include first-type reinforcing ribs 11a distributed along an outer circumference of a friction disc body and second-type reinforcing ribs 11b distributed along an inner circumference of the friction disc body. The first-type reinforcing ribs 11a and the second-type reinforcing ribs 11b are arranged in a staggered manner at a specified angle in a circumferential direction, the angle ranging from 10° to 45°. Along a direction perpendicular to the disc face of the friction disc 1, a total projected area of the first-type reinforcing ribs 11a accounts for 30-45% of a projected area of the friction disc 1, and a total projected area of the second-type reinforcing ribs 11b accounts for 10-25% of the projected area of the friction disc 1. The number of first-type reinforcing ribs 11a and second-type reinforcing ribs 11b is 3-30. Preferably, along the direction perpendicular to the disc face of the friction disc 1, a projection of a single reinforcing rib of the first-type reinforcing ribs 11a is an arc, a center of the arc being an intersection of a center line of the arc and an outer circumference of the friction disc; and a length of the first-type reinforcing rib 11a along a radial direction is 1/10-1/6 of a radius of the friction disc 1. Along the direction perpendicular to the disc face of the friction disc 1, a projection of a single reinforcing rib of the second-type reinforcing ribs 11b is a "U" shape, an open end of the "U" shape faces a projection center of the friction disc 1, and a closed end of the "U" shape faces outward: two sides of the reinforcing rib 11b are symmetrical along a radial direction, and an included angle between the side and a diameter is 10-20°; an arc at the closed end of the "U" shape is tangent to the two sides; and a length of the second-type reinforcing rib 11b along a radial direction is 1/8-3/8 of the radius of the friction disc 1. In this way, the two types of reinforcing ribs are alternately disposed and/or intersect with each other. A relative position of the two, a three-dimensional shape, and a projected area are adjusted, so that stress concentration can be dispersed while achieving high-efficiency heat dissipation, thereby avoiding a problem that the heat dissipation reinforcing ribs are easily broken due to low strength of the carbon-ceramic material and ensuring structural strength of the carbon-ceramic brake disc.

There is a gap between adjacent first-type reinforcing ribs 11a, the gap forming an air inlet 12a of the radial heat dissipation channel 12. The second-type reinforcing rib 11b is provided with a recessed structure, the bottom of the recessed structure being processed with a notch, and the notch forming an air outlet 12b of the radial heat dissipation channel 12; and a connecting groove 13 is formed between adjacent second-type reinforcing ribs 11b, the connecting groove 13 being communicated with the radial heat dissipation channel 12, and the radial heat dissipation channel 12 being communicated with the outside. Therefore, the air inlet 12a, the connecting groove 13, and the air outlet 12b form a curved diameter-changing channel 17, and by means of the change of the flow velocity of the airflow in the variable cross-section channel, the flow of air is accelerated and more heat can be taken away, thereby improving the heat dissipation efficiency. In addition, the connecting grooves 13 communicate with each other to form a wave-shaped planar heat dissipation channel 14, and the wave-shaped planar heat dissipation channel connects all radial heat dissipation channels 12 to form a three-dimensional heat dissipation system penetrating the entire brake disc.

In addition, in this embodiment, a dynamic balance hole 16 is further disposed on the first-type reinforcing rib 11a. The dynamic balance hole 16 is a blind hole, a depth thereof being less than or equal to a thickness of the first-type reinforcing rib 11a. A metal block can be embedded into the dynamic balance hole 16 to increase a weight during adjustment of dynamic balance of the brake disc.

The full carbon-ceramic in this embodiment means that the entire brake disc is made of a carbon-ceramic composite material with a density of 1.8-2.6 g/cm³. In view of the fact that carbon-ceramic composite materials are difficult to be processed directly inside through material removal, two stacked friction discs are directly used to form a whole. In this way, the heat dissipation reinforcing rib 11 and the connecting groove 13 can be milled respectively on one side of each friction disc, thereby improving the production efficiency and production costs.

Referring to FIG. 1 again, the friction discs 1 and the friction discs 1 and the disc hub 2 are locked and connected through connecting structures composed of rivets 7 and bolt assemblies. Specifically, rivet holes 15 are also machined through a same circumference of the disc face of the friction disc 1. In order to ensure assembly reliability of the rivets, the rivet holes 15 are all processed in a physical part of the heat dissipation reinforcing rib 11a, and positions of rivet holes on each brake disc are in a one-to-one correspondence. In the process of stacking the two friction discs 1, the rivet holes are aligned, and then the two friction discs are fixedly inserted into the coaxially aligned rivet holes 15 between the brake discs through the rivets 7, so that the two friction discs 1 are preliminarily integrally connected and anti-rotation circumferential positioning between the friction discs is formed.

Then, the stacked brake discs with the assembled rivets are sleeved on the disc hub 2 as a whole, bolt holes on an inner ring of the friction disc 1 are aligned with bolt holes on disc hub 2 one by one, the bolt 5 is inserted through the bolt holes on the friction disc 1 and the disc hub 2 and the axial positioning washers 3 that are respectively cushioned on outer sides of the friction disc 1 and the disc hub 2, and then are fastened by the nut 6, and the friction disc 1, the disc hub 2, and the axial positioning washer 3 are pressed and locked. Then, a torque pin 4 is assembled between the axial positioning washer 3 and the disc hub 2 to improve a torque transmission capacity between the disc hub and the brake disc and share a part of torque borne by the bolt, thereby improving reliability of a bolt connection.

Figure 4:
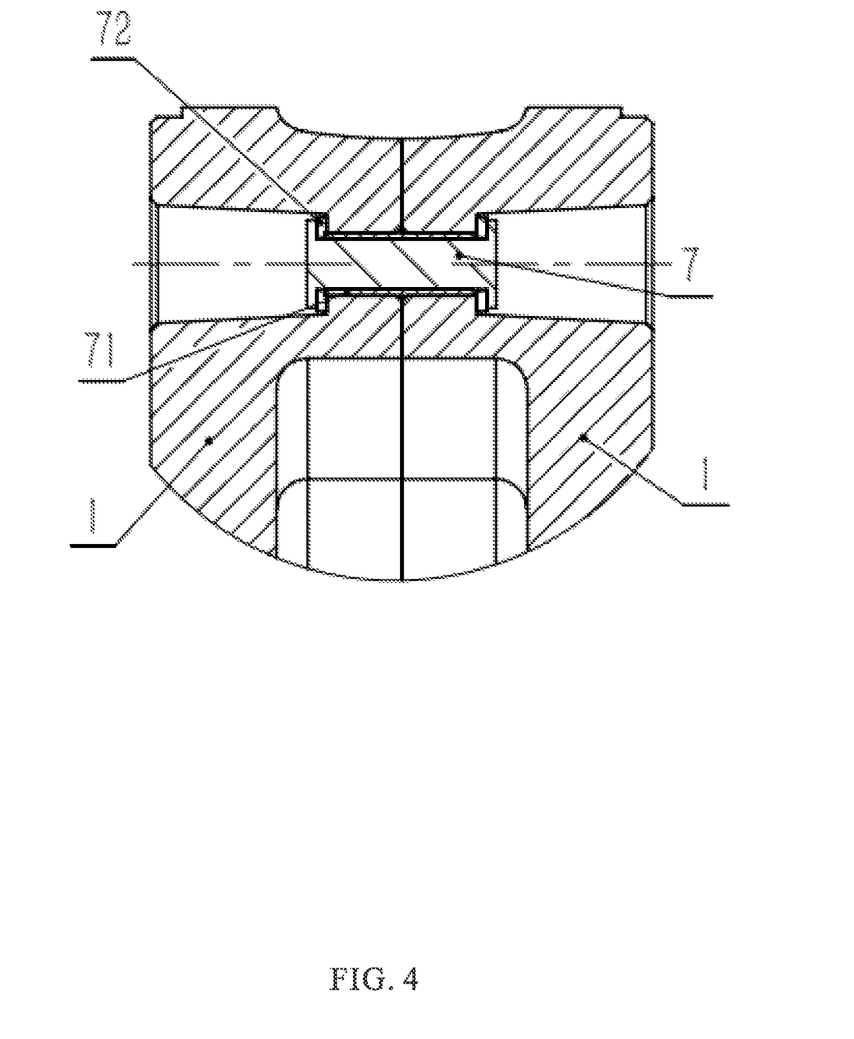
FIG. 4 is a partial view of a rivet connecting structure.
Figure 5:
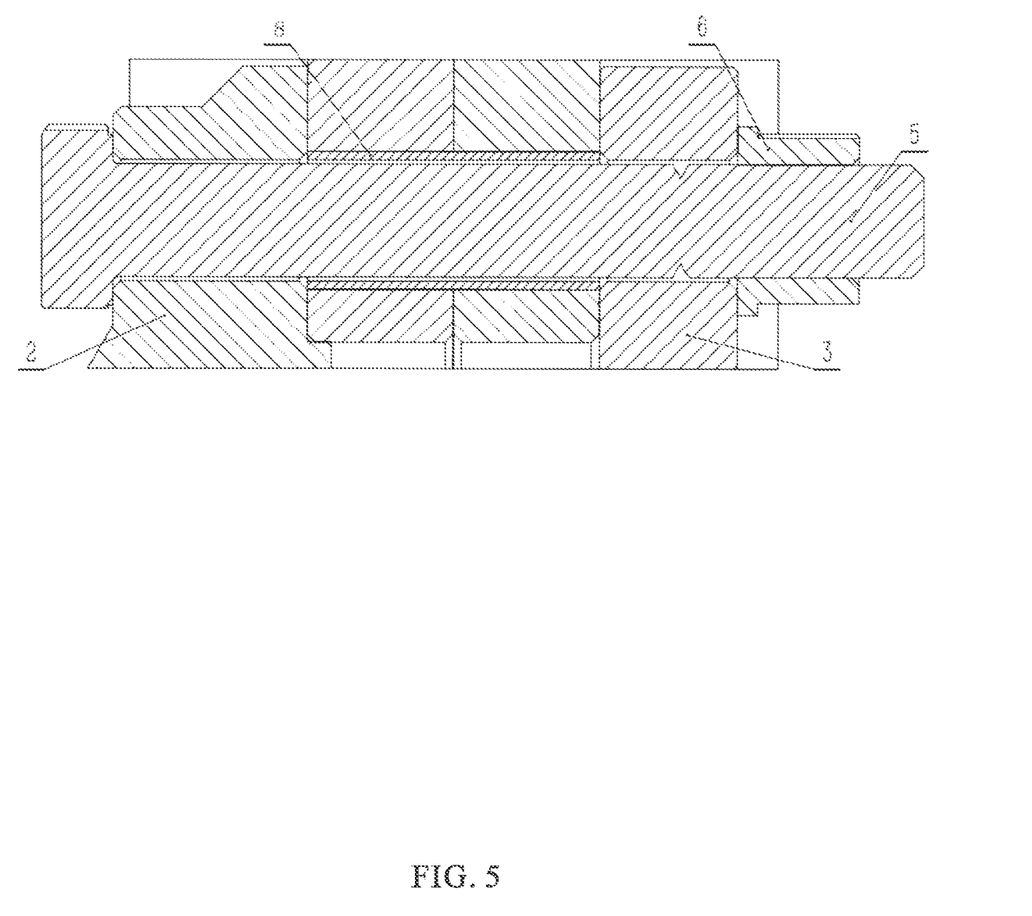
FIG. 5 is a cross-sectional view of a bolt connecting structure.

As shown in FIG. 4 and FIG. 5, in order to reduce large uneven thermal stress on the friction disc 1 due to thermal expansion of the rivet 7 during braking, a ferrule 71 is mounted between the friction disc 1 and the rivet 7 in a radial direction, and the ferrule 71 is sleeved on the rivet 7 to separate the friction disc 1 and the rivet 7. In order to prevent the friction disc 1 from being subjected to large uneven static pressure during riveting, a washer 72 is mounted between the friction disc 1 and the rivet 7 in an axial direction. In addition, in order to reduce large uneven thermal stress on the friction disc 1 due to thermal expansion of the bolt 5 during braking, and to prevent the friction disc 1 from being subjected to large uneven static pressure due to eccentricity of the bolt 5 under a moment load, a steel sleeve 8 is mounted between the friction disc 1 and the bolt 5 in a screw radial direction.

Figure 6:
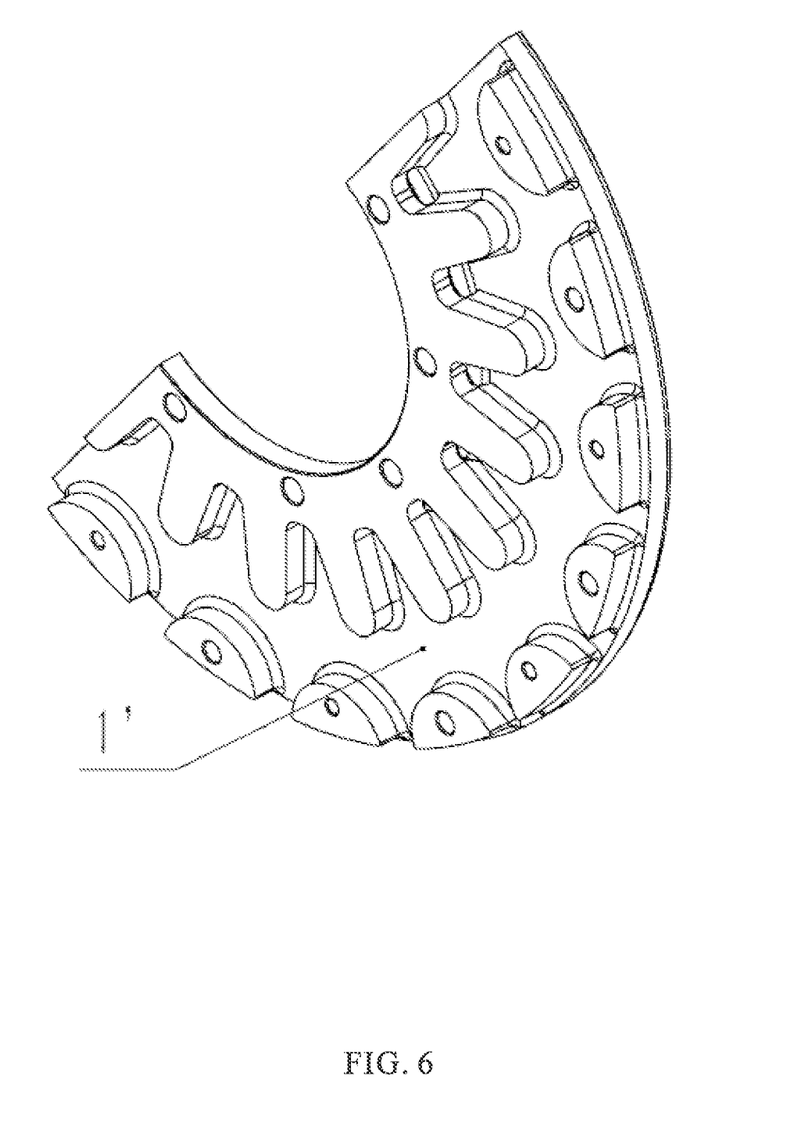
FIG. 6 is a schematic diagram of a split friction disc in an embodiment.

In practical applications of this embodiment, two friction discs 1 with an integral structure shown in FIG. 3 can be used for stacking assembly. In order to further improve convenience of disassembly and assembly of the brake disc, split friction discs 1' shown in FIG. 6 can also be used for stacking assembly. After the split friction disc structure is damaged in a specified region of the brake disc, the split friction disc in the damaged region can be replaced respectively. The split friction discs 1' may be radially segmented into a semi-circular structure shown in FIG. 6 or a fan-shaped are ring structure with more than two pieces along the friction disc shown in FIG. 3. A heat dissipation structure and a connecting structure after the split friction discs 1' are spliced into an integral ring are the same as the friction disc 1 of the integral structure, and independent connecting structures are disposed on each split friction disc 1' and between each split friction disc 1' and the disc hub 2. In this way, it can be ensured that each split friction disc 1' is respectively disassembled and assembled. Compared with the existing carbon ceramic disc, heat dissipation performance of the obtained product in the present invention is improved by at least 10%, and a service life is improved by 20%.

The carbon-ceramic axle disc of the present invention and an axle disc with a carbon-ceramic disc structure of an existing similar car adopt ANSYS Workbench 18.1 software to perform emergency braking on a train at 350 km/h. Results show that the carbon-ceramic axle disc of the present invention has a maximum braking temperature of 702° C. and maximum thermal stress of a disc face is 67 MPa, while the axle disc with the carbon-ceramic disc structure of the existing similar car has a maximum braking temperature of 791° C. and maximum thermal stress of a disc face is 88 MPa. Compared with the existing carbon-ceramic disc, the obtained product in the present invention significantly improves heat dissipation performance, and effectively disperse stress concentration, thereby greatly improving reliability of the product.

A size of the full carbon-ceramic axle-mounted brake disc in this embodiment is customized according to relevant standards. Certainly, the designed structure of the full carbon-ceramic axle-mounted brake disc in the present invention is suitable for all transport vehicles, especially for high-speed trains. Basic principles, main features, and advantages of the present invention are described in the foregoing embodiments. A person skilled in the art should understand that the present invention is not limited by the foregoing embodiments. The foregoing embodiments and the descriptions of the specification merely explain specific working principles of the present invention. Various variations and improvements of the present invention may further be made without departing from the spirit and scope of the present invention, and all the variations and improvements fall within the protection scope of the present invention. The protection scope of the present invention is subject to the appended claims and the equivalents thereof.

What is claimed is:

1. A full carbon-ceramic axle-mounted brake disc, comprising a disc hub and a plurality of friction discs sleeved on the disc hub and coaxially stacked, wherein the plurality of friction discs and the disc hub are locked and integrally connected through a plurality of connecting structures; and each of the plurality of friction discs are made of a carbon-ceramic composite material and include a plurality of heat dissipation reinforcing ribs arranged radially on a disc face and a back face, the plurality of heat dissipation reinforcing ribs between a plurality of stacked friction discs are in contact with each other on a one-to-one basis;

in a friction disc of the plurality of friction discs, a plurality of radial heat dissipation channels are formed on two sides of a heat dissipation reinforcing rib of the plurality of heat dissipation reinforcing ribs, and a connecting groove of a plurality of connection grooves connecting the plurality of radial heat dissipation channels on the two sides is formed between the plurality of heat dissipation reinforcing ribs;

the plurality of heat dissipation reinforcing ribs are symmetrically distributed with respect to a center of the disc face; and the plurality of heat dissipation reinforcing ribs comprise two types of reinforcing ribs, the plurality of heat dissipation reinforcing ribs distributed along an outer circumference of a friction disc body in the plurality of heat dissipation reinforcing ribs being defined as a first-type of reinforcing ribs, and the plurality of heat dissipation reinforcing ribs distributed along an inner circumference of the friction disc body in the plurality of heat dissipation reinforcing ribs being defined as a second-type of reinforcing ribs, wherein the first-type of reinforcing ribs and the second-type of reinforcing ribs are arranged in a staggered manner at a specified angle in a circumferential direction, an angle ranging from 10° to 45°;

a gap is provided between a plurality of adjacent first-type reinforcing ribs, the gap forms an air inlet of a radial heat dissipation channel of the plurality of radial hear dissipation channels; and a second-type reinforcing rib of the second-type of reinforcing ribs is provided with a recessed structure, a bottom of the recessed structure being processed with a notch, and the notch forming an air outlet of the radial heat dissipation channel; and the connecting groove of the plurality of connection grooves is formed between adjacent second-type of reinforcing ribs, the connecting groove of the plurality of connection grooves being communicated with the radial heat dissipation channel of the plurality of radial hear dissipation channels, and the radial heat dissipation channel of the plurality of radial hear dissipation channels being communicated with an outside.

2. The full carbon-ceramic axle-mounted brake disc according to claim 1, wherein along a direction perpendicular to the disc face of the friction disc of the plurality of friction discs, a total projected area of the first-type of reinforcing ribs accounts for 30-45% of a projected area of the friction disc of the plurality of friction discs, and a total projected area of the second-type of reinforcing ribs accounts for 10-25% of the projected area of the friction disc of the plurality of friction discs.

3. The full carbon-ceramic axle-mounted brake disc according to claim 2, wherein
the number of the first-type of reinforcing ribs and the second-type of reinforcing ribs is 3-30.

4. The full carbon-ceramic axle-mounted brake disc according to claim 1, wherein a thickness of the heat dissipation reinforcing rib of the plurality of heat dissipation reinforcing ribs is ⅓-⅗ of a thickness of the friction disc of the plurality of friction discs.

5. The full carbon-ceramic axle-mounted brake disc according to claim 1, wherein
a number of the first-type of reinforcing ribs and the second-type of reinforcing ribs is 3-30.

6. The full carbon-ceramic axle-mounted brake disc according to claim 1, wherein along a direction perpendicular to the disc face of the friction disc of the plurality of friction discs, a projection of a single reinforcing rib of the first-type of reinforcing ribs is an arc, a center of the arc being an intersection of a center line of the arc and an outer circumference of the friction disc of the plurality of friction discs; and a length of a first-type reinforcing rib of the first-type of reinforcing ribs along a radial direction is ​1/10-⅙ of a radius of the friction disc of the plurality of friction discs, and
along the direction perpendicular to the disc face of the friction disc of the plurality of friction discs, a projection of a second-type reinforcing rib of the second-type of reinforcing ribs is a U shape, an open end of the U shape faces a projection center of the friction disc of the plurality of friction discs, and a closed end of the U shape faces outward; two sides of the second-type reinforcing rib of the second-type of reinforcing ribs are symmetrical along a radial direction, and an included angle between a side and a diameter is 10-20°; an arc at the closed end of the U shape is tangent to the two sides; and a length of the second-type reinforcing rib of the second-type of reinforcing ribs along a radial direction is ⅛-⅜ of the radius of the friction disc of the plurality of friction discs.

7. The full carbon-ceramic axle-mounted brake disc according to claim 1, wherein a plurality of rivet holes and a plurality of dynamic balance holes are alternately disposed on the first-type of reinforcing ribs; a rivet hole of the plurality of rivet holes is a through hole penetrating the disc face; and a dynamic balance hole of the plurality of dynamic balance holes is a blind hole, a depth of the dynamic balance hole of the plurality of dynamic balance holes being less than or equal to a thickness of the first-type reinforcing rib of the first-type of reinforcing ribs.

8. The full carbon-ceramic axle-mounted brake disc according to claim 1, wherein the air inlet, the connecting groove, and the air outlet form a curved diameter-changing channel.

9. The full carbon-ceramic axle-mounted brake disc according to claim 1, wherein the plurality of connecting grooves are symmetrically distributed with respect to the center of the disc face of the friction disc of the plurality of friction discs; and all the plurality of connecting grooves are communicated to form a wave-shaped heat dissipation channel.

10. The full carbon-ceramic axle-mounted brake disc according to claim 1, wherein the plurality of friction discs are made of the carbon-ceramic composite material with a density of 1.8-2.6 g/cm$^3$.

11. The full carbon-ceramic axle-mounted brake disc according to claim 1, wherein the friction disc of the plurality of friction discs is formed by splicing several friction discs split along a radial direction, a plurality of independent connecting structures being disposed between the plurality of stacked split friction discs and between a plurality of split friction discs and the disc hub.

12. A full carbon-ceramic axle-mounted brake disc, comprising a disc hub and a plurality of friction discs sleeved on the disc hub and coaxially stacked, wherein the plurality of friction discs and the disc hub are locked and integrally connected through a plurality of connecting structures; and each of the plurality of friction discs are made of a carbon-ceramic composite material and include a plurality of heat dissipation reinforcing ribs arranged radially on a disc face and a back face, the plurality of heat dissipation reinforcing ribs between a plurality of stacked friction discs are in contact with each other on a one-to-one basis;

in a friction disc of the plurality of friction discs, a plurality of radial heat dissipation channels are formed on two sides of a heat dissipation reinforcing rib of the plurality of heat dissipation reinforcing ribs, and a connecting groove of a plurality of connection grooves connecting the plurality of radial heat dissipation channels on the two sides is formed between the plurality of heat dissipation reinforcing ribs;

the connecting structure comprises a rivet for stacking and circumferential positioning between the plurality of friction discs and a bolt assembly for locking between the friction disc of the plurality of friction discs and the disc hub;

the rivet is fixedly inserted into a rivet hole between the plurality of stacked friction discs, a ferrule being sleeved on the rivet; and     the bolt assembly comprises an axial positioning washer of a plurality of axial positioning washers, a torque pin, a bolt, a nut, and a steel sleeve, wherein the steel sleeve being inserted into a bolt hole of the friction disc of the plurality of friction discs, the bolt being inserted through the bolt hole on the friction disc of the plurality of friction discs and the disc hub and being fastened by the nut, the plurality of axial positioning washers being respectively cushioned on outer sides of the friction of the plurality of friction discs and the disc hub and between the nut and a screw cap of the bolt, and the torque pin being assembled between the axial positioning washer of the plurality of axial positioning washers and the disc hub.

13. The full carbon-ceramic axle-mounted brake disc according to claim 12, wherein the rivet is made of a metal material, and a length of the rivet is 1/16-½ of a total thickness of the full carbon-ceramic axle-mounted brake disc and is preferably ⅛-¼ of the total thickness of the brake disc; and a thermal expansion coefficient of the metal material is less than or equal to $10 \times 10^{-6}$/K, and a tensile strength of the metal material is greater than or equal to 400 MPa.

\* \* \* \* \*